H. J. HASS.
RUNNING GEAR FOR AUTOMOBILES.
APPLICATION FILED APR. 14, 1906.
924,061.
Patented June 8, 1909.
2 SHEETS—SHEET 1.
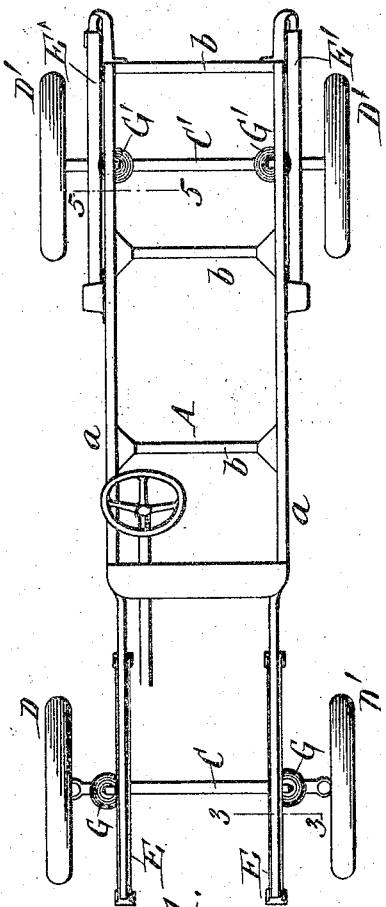
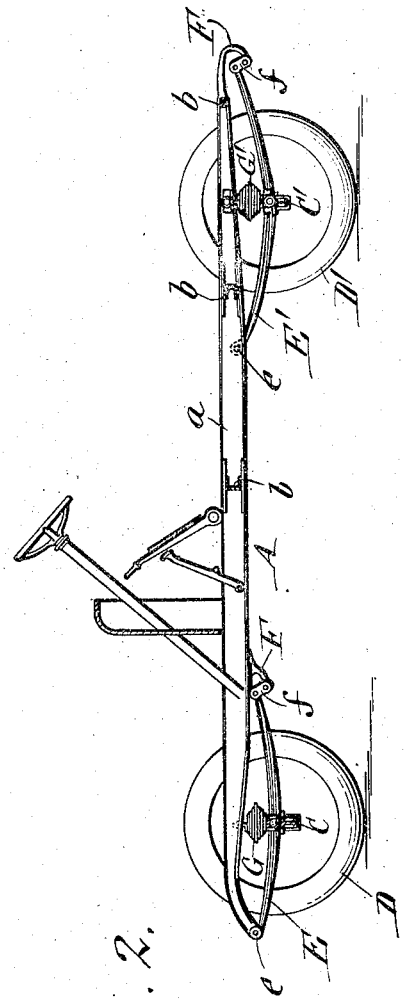

H. J. HASS.
RUNNING GEAR FOR AUTOMOBILES.
APPLICATION FILED APR. 14, 1906.

924,061.

Patented June 8, 1909.
2 SHEETS—SHEET 2.

Witnesses:

Herman J. Hass
Inventor
by Geyer & Topp
Attorneys.

UNITED STATES PATENT OFFICE.

HERMAN J. HASS, OF BUFFALO, NEW YORK, ASSIGNOR TO E. R. THOMAS MOTOR COMPANY, OF BUFFALO, NEW YORK.

RUNNING-GEAR FOR AUTOMOBILES.

No. 924,061.  Specification of Letters Patent.  Patented June 8, 1909.

Application filed April 14, 1906. Serial No. 311,686.

*To all whom it may concern:*

Be it known that I, HERMAN J. HASS, a citizen of the United States, residing at Buffalo, in the county of Erie and State of New York, have invented a new and useful Improvement in Running-Gears for Automobiles, of which the following is a specification.

This invention relates to an auxiliary cushioning or compensating device which is more particularly designed to supplement the action of the main springs used on the running gear of automobiles for the purpose of aiding the main springs when the same are carrying an unusual load and also to prevent undue rebounding thereof when the automobile runs over an opening or obstruction in the road.

Figure 5:
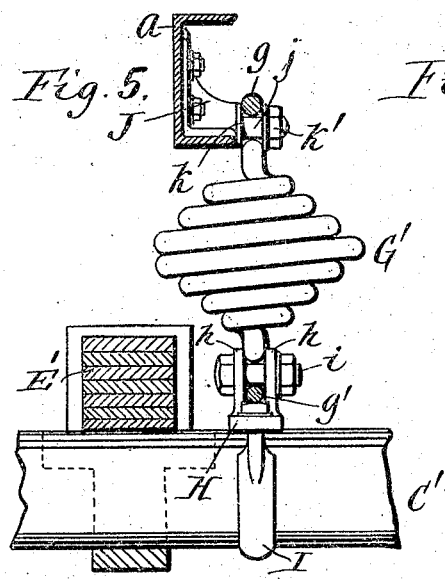
Figure 6:
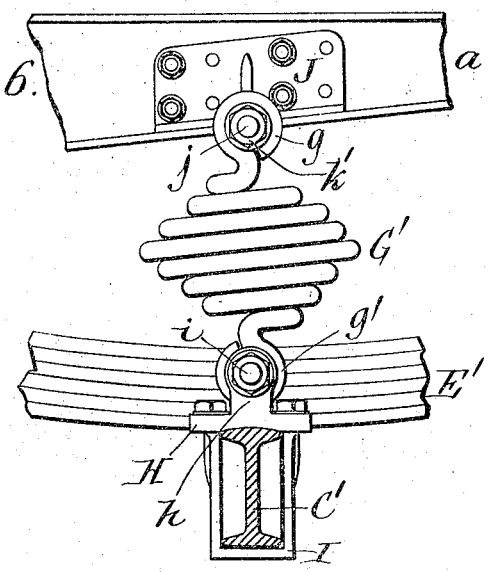
Figure 3:
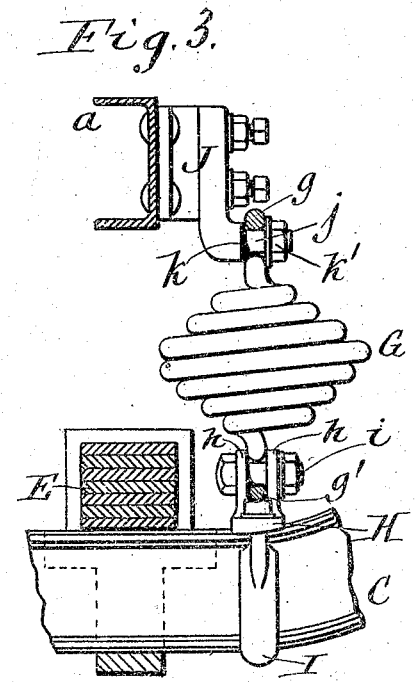
Figure 4:
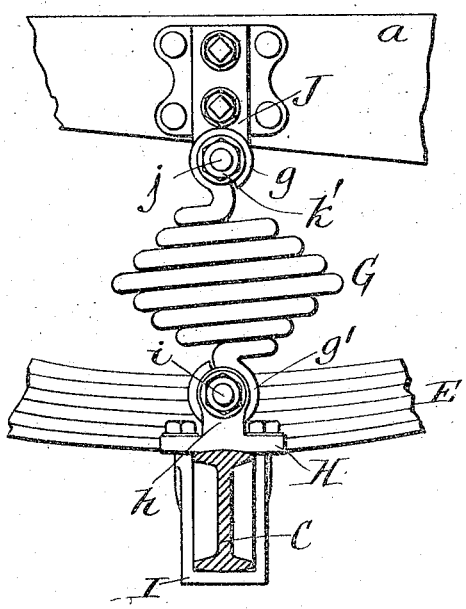

In the accompanying drawings consisting of two sheets: Figure 1 is a top plan view of the running gear of an automobile equipped with my improved auxiliary cushioning device. Fig. 2 is a vertical longitudinal section thereof. Fig. 3 is a fragmentary cross section, on an enlarged scale, in line 3—3, Fig. 1 showing one of the compensating or auxiliary springs of the cushioning device applied to the front axle adjacent to one of the front main springs. Fig. 4 is a sectional side elevation of the same. Fig. 5 is a fragmentary cross section, on an enlarged scale, in line 5—5, Fig. 1, showing one of the compensating or auxiliary springs of the cushioning device applied to the frame and rear axle adjacent to one of the rear main springs. Fig. 6 is a sectional side elevation thereof.

Similar letters of reference indicate corresponding parts throughout the several views.

A represents the main frame of an automobile chassis or running gear which consists essentially of two longitudinal side bars or rails $a$ and a plurality of cross bars $b$ connecting the side bars.

C, C$^1$ represent the front and rear axles upon the ends of which the wheels D, D$^1$ are mounted in the usual manner.

E, E$^1$ represent the front and rear main springs of semi-elliptic form which yieldingly connect the front and rear axles with the main frame. Each of these springs is composed of a number of superposed curved leaves which are connected centrally with an axle and connected at its front end directly with the adjacent side bar of the main frame by means of a transverse and horizontal pivot, pin or bolt $e$ while its rear end is pivotally connected with a depending bracket or hanger F on the adjacent side bar by means of a vertically swinging link $f$ which permits the main spring to flatten or straighten out more or less under the varying loads which are placed upon the same without cramping.

G, G, G$^1$, G$^1$ represent the front and rear springs of the secondary or auxiliary cushioning or compensating device, the front pair G, G being arranged over the front axle and on the outer side of the frame side bars and the rear pair G$^1$, G$^1$ being arranged over the rear axle and on the inner side of the frame side bars. Each of these auxiliary springs is constructed in the form of a double volute, being widest at the center and the convolutions of the spring becoming gradually smaller in diameter toward the upper and lower ends thereof where the spring terminates in upper and lower attaching eyes $g$, $g^1$ the axes of which are horizontal and transverse relatively to the main frame.

The eye at the lower end of each auxiliary spring is pivotally connected with the axle below the same by means of a rest bracket or clip plate H having two upwardly projecting lugs or ears $h$ which receive the lower eye of the adjacent auxiliary spring between them, a horizontal bolt $i$ passing through said lower eye and lugs, and a clip I embracing the adjacent axle and connected with the plate H. The lower end of the front auxiliary springs G, G are attached to the front axle outside of the adjacent main springs E, E but the corresponding ends of the rear auxiliary springs are attached to the respective axle on the inner side of the rear main springs E$^1$, E$^1$.

The upper eye of each auxiliary spring is pivotally connected to a rest or bracket J on the adjacent frame side bar by means of a stud $j$ arranged horizontally and transversely and passing through the upper eye of the auxiliary spring the latter being confined on said stud by a shoulder $k$ and nut $k^1$ arranged thereon on opposite sides of said eye, as shown in Figs. 3 and 5. The attaching brackets J at the upper ends of the front auxiliary G, G, are secured to the frame side bars on the outer sides thereof while those of the rear auxiliary springs G¹, G¹ are secured to the frame side bars on the inner sides thereof.

The several auxiliary springs are so constructed that they must be stretched or distended somewhat in a vertical direction in order to permit of attaching the opposite ends of each spring to its respective clip plate H and the bracket J when no load is on the running gear. The preliminary stretch thus imparted to the auxiliary springs is so determined that when a load of normal weight is placed upon the frame of the automobile and the same is depressed accordingly the auxiliary springs are permitted to relax into their neutral or normal condition at which time the main springs alone carry the load and are strained accordingly.

If a load should be placed upon the frame which is more than normal the auxiliary springs will be compressed somewhat at the same time that the strain on the mainsprings is increased and the latter are flattened, whereby the auxiliary springs aid the main springs in yieldingly supporting the load. While compressing the auxiliary springs at this time its convolutions are nested one within the other more or less; thereby obtaining a full spring action within a comparatively small range of movement.

When the main springs are curved abnormally by rebounding of the frame from the axles and the auxiliary springs are stretched and thus oppose the main springs and resist this rebound, thereby avoiding severe straining of the same and undue jarring of the frame and the load thereon. In other words, the auxiliary spring is inactive or neutral when the main spring is under a normal superincumbent load but when this load increases the auxiliary spring is compressed and aids the main spring in carrying the same and when this load is reduced by rebounding thereof and the main spring becomes inactive or neutral by removal of the load thereon, then the auxiliary spring is stretched and again becomes active by adding its power to the load and resisting movement of the latter away from the main spring and axle. The periods of inaction of the main and auxiliary springs therefore do not occur at the same time but take place in succession and in such manner that the auxiliary spring at one time acts with the main spring to carry the load and at another time with the load for compressing the main spring.

As the main springs are alternately flattened and curved under the fluctuations of the load upon the same the axles and the body of the main springs move forward and backward more or less this being permitted by the links f which yieldingly connect the rear ends of the main springs with the frame side bars. During this backward and forward movement of the axles and main springs the auxiliary springs owing to the connection at their lower ends with the axles are moved in the same direction and turn on their upper eyes which are fulcrumed on the upper brackets J so that the axis of each of the auxiliary springs is always on a line drawn through the pivots connecting the ends of the auxiliary spring with the frame side bar and axle. By this means the auxiliary springs are never cramped or distorted but always remain in condition to properly aid the main springs in carrying the load or resisting rebound regardless of the particular position of the axles and main springs relatively to the main frame.

My improved auxiliary cushioning device is particularly desirable for automobiles when traveling over roads containing pitch holes or raised obstacles inasmuch as severe rebound and shocks are avoided upon striking the same.

I claim as my invention:—

1. A running gear for automobiles, comprising a main frame which has a narrow front part and a wide rear part, front and rear axles arranged transversely underneath the narrow and wide parts of said frame, respectively, main springs connecting said axles with the main frame, front and rear auxiliary springs connecting said axles and main frame, the front auxiliary springs being arranged on the outer side of the front main springs and secured to the other side of the main frame and the rear auxiliary springs being arranged on the inner side of the rear main springs and secured to the inner side of the main frame, substantially as set forth.

2. A running gear for automobiles, comprising a main frame, axles arranged transversely below said frame, semi-elliptical springs each connected centrally with one of said axles and at one end directly with the main frame while its opposite end is connected indirectly with the frame by a vertically swinging link, auxiliary springs having upper and lower eyes the axes of which are transverse relatively to the main frame, and transverse pivots mounted on the axles and frame and passing through said eyes, substantially as set forth.

3. A running gear for automobiles, comprising a main frame, axles arranged transversely below said frame, semi-elliptical springs each connected centrally with one of said axles and at one end directly with the main frame while its opposite end is connected indirectly with the frame by a vertically swinging link, auxiliary springs having upper and lower eyes the axes of which are transverse relatively to the main frame, clip plates secured to the axles and each having a pair of lugs which receive the lower eye of one of said auxiliary springs, a transverse bolt passing through each pair of said lugs and the spring eye between the same, and brackets arranged on the main frame and each provided with a transverse stud which passes through the upper eye of one of said auxiliary springs and has a shoulder and nut on opposite sides of said upper eye, substantially as set forth.

Witness my hand this 13th day of April, 1906.

HERMAN J. HASS.

Witnesses:
FREDERICK P. WEHIBAS,
THEO. L. POPP.